(12) United States Patent
Pepicelli et al.

(10) Patent No.: US 8,712,608 B2
(45) Date of Patent: Apr. 29, 2014

(54) SYSTEM AND METHOD OF AUTOMATIC PILOTING FOR IN-FLIGHT REFUELLING OF AIRCRAFT, AND AIRCRAFT COMPRISING SAID SYSTEM

(75) Inventors: Geremia Pepicelli, San Maurizio Canavese (IT); Gaetano Portaro, Turin (IT); Renzo Bava, Albugnano (IT)

(73) Assignee: Alenia Aeronautics S.p.A., Pomigliano d'Arco (IT)

( * ) Notice: Subject to any disclaimer, the term of this patent is extended or adjusted under 35 U.S.C. 154(b) by 617 days.

(21) Appl. No.: 12/968,692

(22) Filed: Dec. 15, 2010

(65) Prior Publication Data

US 2012/0059536 A1 Mar. 8, 2012

(30) Foreign Application Priority Data

Dec. 16, 2009 (IT) ................. TO2009A0993

(51) Int. Cl.
*G06F 7/00* (2006.01)
*G01C 23/00* (2006.01)
(52) U.S. Cl.
USPC ............... 701/11; 701/3; 701/4; 701/476
(58) Field of Classification Search
USPC ............ 701/3, 4, 476; 342/357.32, 357.52; 244/135 A, 135 B, 135 R
See application file for complete search history.

(56) References Cited

U.S. PATENT DOCUMENTS

| 4,170,773 A | 10/1979 | Fitzsimmons et al. |
| 6,669,145 B1 | 12/2003 | Green |
| 6,889,941 B1 | 5/2005 | McElreath |
| 2004/0102876 A1* | 5/2004 | Doane ........................... 701/9 |
| 2005/0116109 A1* | 6/2005 | Berard ..................... 244/135 A |
| 2006/0216674 A1* | 9/2006 | Baranov et al. .................. 434/29 |
| 2008/0099628 A1* | 5/2008 | Greene ........................ 244/191 |
| 2008/0114544 A1* | 5/2008 | Liu et al. ...................... 701/213 |
| 2008/0265097 A1* | 10/2008 | Stecko et al. ............. 244/135 A |
| 2008/0270027 A1* | 10/2008 | Stecko et al. ................ 701/214 |
| 2009/0015436 A1* | 1/2009 | Lundberg et al. ............ 340/945 |
| 2009/0045290 A1 | 2/2009 | Small |
| 2009/0248225 A1* | 10/2009 | Stecko et al. ..................... 701/3 |

FOREIGN PATENT DOCUMENTS

| EP | 1 424 283 A1 | 2/2004 |
| GB | 2 438 218 A | 11/2007 |

* cited by examiner

*Primary Examiner* — Ian Jen
(74) *Attorney, Agent, or Firm* — Gottlieb, Rackman & Reisman, P.C.

(57) ABSTRACT

An automatic-piloting system configured for being set on a receiver aircraft and for controlling operations of in-flight refuelling of said receiver aircraft, comprising: first detection means, set on the receiver aircraft and configured for acquiring first geometrical information associated to a first detection area and a second detection area belonging to a tanker aircraft, the first and second detection areas being linked together by a geometrical relation known to the automatic-piloting system; processing means, configured for determining, on the basis of the first geometrical information acquired, first position information associated to a relative position of the receiver aircraft with respect to the tanker aircraft; and an automatic-pilot device coupled to the processing means and configured for varying flight parameters of the receiver aircraft on the basis of the first position information.

34 Claims, 8 Drawing Sheets

SYSTEM AND METHOD OF AUTOMATIC PILOTING FOR IN-FLIGHT REFUELLING OF AIRCRAFT, AND AIRCRAFT COMPRISING SAID SYSTEM

The present invention relates to a system and to a method of automatic piloting for in-flight refuelling of aircraft and to an aircraft comprising said system, in particular for governing the approach in conditions of safety of an aircraft to be refuelled to a tanker aircraft.

BACKGROUND OF THE INVENTION

In-flight refuelling systems of a known type envisage the transfer of fuel between a tanker aircraft and a receiver aircraft by means of a hose passing through a rigid pipe (known as "boom") and a telescopic line. The boom is fixed to a rear portion of the fuselage of the tanker aircraft through a semi-rigid connection, which enables a certain degree of freedom of movement. It is evident that the receiver aircraft, in order to carry out successfully the operation of in-flight refuelling, must first of all carry out a correct approach to the tanker aircraft, keeping a distance not greater than the distance that can be covered by the boom and the telescopic line, and then maintain a position and a speed as conformable as possible to that of the tanker aircraft.

A different refuelling method envisages instead the use of a hose, provided, on a terminal portion thereof, with a drogue, configured for connecting up to an inlet mouth of the refuelling system of the receiver aircraft. The receiver aircraft must execute minimal movements such as to reach the drogue of the hose and remain in a fixed position with respect to the tanker aircraft.

The operation of approach of the receiver aircraft to the area envisaged for refuelling (known as "rendez-vous area") and of initial positioning with respect to the tanker aircraft is currently executed by the pilot of the receiver aircraft. For experimental purposes, during the most critical operations of fine alignment (for example, engagement of the hose with the fuel-receiving line of the receiver aircraft) tests have been conducted, in which the pilot of the receiver aircraft is supported in the correct positioning by alignment systems of an optical type, in particular devices working in the visible or infrared devices, which issue an optical signal detected by appropriate optical detectors set on the receiver aircraft, in particular in the proximity of the fuel-receiving line. However, said alignment systems, used only in the terminal step of engagement with the fuel-receiving line, envisage an active intervention on the part of the pilot of the receiver aircraft in maintaining the position of the receiver aircraft stable with respect to that of the tanker aircraft during the refuelling procedure.

A solution of a known type to this problem is described in the U.S. Pat. No. 6,669,145. In detail, this solution envisages setting on the tanker aircraft and/or on the drogue fixed to the boom a plurality of reflectors, configured for operating as polarization filters. The receiver aircraft has, instead, available a source of radiation (for example, a LED or a laser) and a detector of radiation (for example, a photodiode).

In the final step of approach between the receiver aircraft and the tanker aircraft, the receiver aircraft issues, by means of the source of radiation, an incident radiation that propagates in the direction of the tanker aircraft and/or of the drogue. The reflectors set on the tanker aircraft and/or on the drogue reflect the incident radiation, each generating a reflected radiation of its own (characterized by a polarization of its own), which is detected by the detector of radiation set on the receiver aircraft. By analysing the reflected radiation, and in particular the polarization of the signal received, the receiver aircraft is able to know its own position with respect to each reflector, and, consequently, with respect to the tanker aircraft and/or the boom.

The system described in U.S. Pat. No. 6,669,145 presents the disadvantage of entailing considerable modifications, including structural ones, to the tanker aircraft and to the drogue of the boom. This involves a high cost for updating existing tanker aircraft, and an increase in the production costs of tanker aircraft built according to the teaching of the document U.S. Pat. No. 6,669,145. Furthermore, according to said system, a receiver aircraft that requires in-flight refuelling, could complete successfully the steps of refuelling by interfacing only with a tanker aircraft built according to the teaching of the document U.S. Pat. No. 6,669,145, and not with a generic tanker aircraft.

A further solution of a known type for carrying out automatic in-flight refuelling is described in US 2008/0265097. The method described in US 2008/0265097 regards control of the flight of the tanker aircraft and control of orientation of the boom. In this case, in fact, the tanker aircraft is provided with an inertial measurement unit (IMU), a GPS device, and a processor, configured for calculating a current state of inertial navigation of the tanker aircraft compensating possible errors (for example, due to phenomena of electronic noise of the IMU and GPS location errors). The tanker aircraft can moreover comprise electro-optical sensors, for acquiring images of the boom and/or of the receiver aircraft during the final step of approach for refuelling.

Finally, the patent No. GB 2 438 218 describes a method and a system for enabling relative flight of two aircraft, in particular a tanker aircraft and a receiver aircraft that is to be refuelled. The correct position of flight of the receiver aircraft is maintained by comparing position data obtained via a GPS receiver set both on the tanker aircraft and on the receiver aircraft. The GPS measurements are integrated with further measurements obtained by means of acceleration sensors and angular-velocity sensors, set both on board the tanker aircraft and on board the receiver aircraft. This system, however, does not guarantee a high degree of precision (at least at the centimeter level) during the final step of approach and contact between the boom and the receiver aircraft (last 10 m).

SUMMARY OF THE INVENTION

The aim of the present invention is to provide a system and a method of automatic piloting for in-flight refuelling of aircraft, and an aircraft comprising said system, that will enable the disadvantages of the known art to be overcome, and in particular that will enable refuelling of the receiver aircraft by automating the procedures of approach and of fine alignment between the receiver aircraft and the tanker aircraft without making structural modifications to the tanker aircraft or by making modifications with minimal structural impact to the tanker aircraft.

Provided according to the present invention are a system and a method of automatic piloting for in-flight refuelling of aircraft, and an aircraft comprising said system, as defined in Claims 1, 13, and 34, respectively.

BRIEF DESCRIPTION OF THE DRAWINGS

For a better understanding of the present invention, a preferred embodiment is now described, purely by way of non-limiting example, with reference to the attached drawings, wherein.

DETAILED DESCRIPTION OF THE INVENTION

Figure 1:
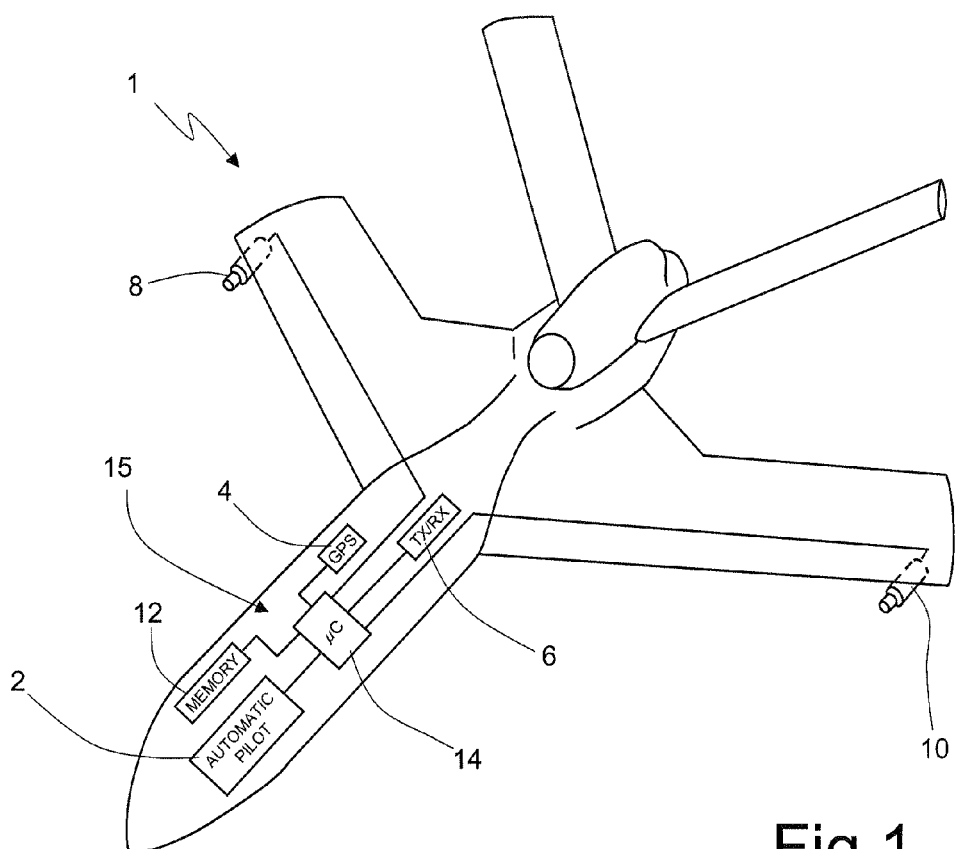
FIG. 1 is a schematic illustration of a receiver aircraft provided with an automatic-piloting system according to the present invention.

FIG. 1 shows a receiver aircraft 1, which may be indifferently either an unmanned aerial vehicle (UAV) or a manned aerial vehicle, configured for automatic approach of a tanker aircraft (illustrated in FIG. 2) for operations of in-flight refuelling. In the case of UAVs, there may in any case be envisaged the presence, on the ground, of a remote pilot, who can govern the aircraft at a distance. In the sequel of the description, if not otherwise indicated, the term "pilot" refers indifferently to a pilot present on board the aircraft or one located at a distance from the aircraft and in communication therewith, for control of the course or other operations.

The receiver aircraft 1 comprises an automatic-piloting system 15 for enabling in-flight refuelling, including: an autonomous flight device 2, configured for controlling course and flight parameters (speed, altitude, etc.) of the receiver aircraft 1; a positioning device 4, for example a GPS receiver, configured for acquiring a GPS signal in order to detect position co-ordinates of the receiver aircraft 1 during flight; a transceiver device 6, configured for communicating in reception and transmission with a respective transceiver device set on a tanker aircraft (illustrated in FIG. 2); a first optical device 8 and a second optical device 10, for example a first video camera and a second video camera, each set on a respective wing of the receiver aircraft 1, preferably in a lower portion of each respective wing, and configured for acquiring films and/or images in the visible or in the infrared; a memory 12; and a microcontroller 14, connected to the memory 12, to the first and second optical devices 8 and 10, to the transceiver device 6, to the positioning device 4, and to the autonomous flight device 2. The microcontroller 14 and the memory 12 can be replaced by an integrated digital processor (not illustrated).

According to a preferred embodiment of the present invention, the first and second optical devices 8, 10 are passive optical detectors. In this case, a passive optical detector indicates an optical device configured for acquiring a signal (in particular, an optical signal, indifferently in the spectrum of the visible or of the invisible, for example infrared) generated by a source set at a distance therefrom. The first and second optical devices 8, 10, of a passive type, are hence not configured for issuing a signal (in particular, en optical signal) and acquiring a portion of the signal issued reflected by an obstacle or by another object set at a distance. Passive optical devices are, for example, video cameras or photographic cameras.

Figure 2:
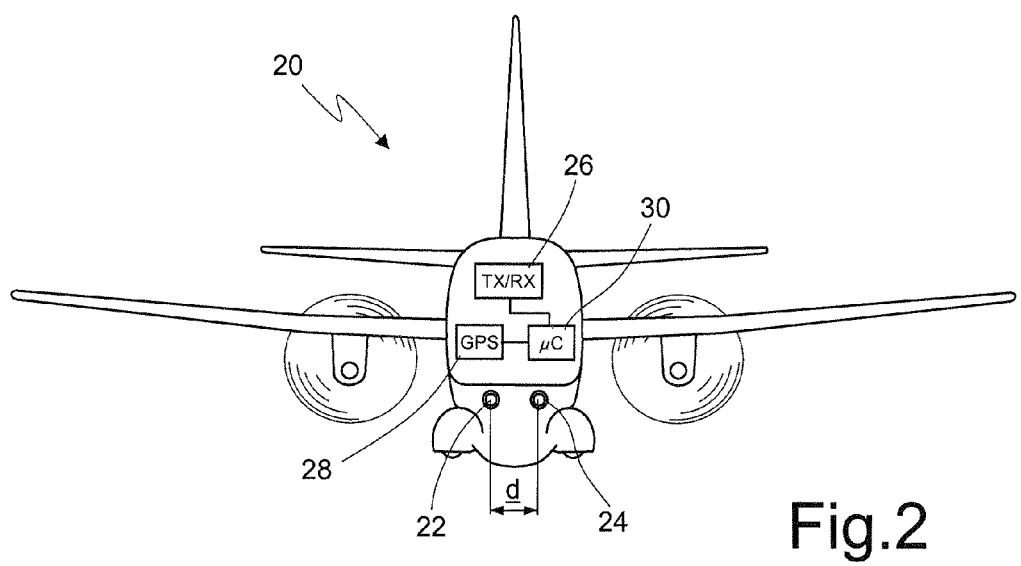
FIG. 2 is a schematic illustration of a tanker aircraft configured for co-operating with the receiver aircraft of FIG. 1 during approach of the receiver aircraft, according to the present invention.

FIG. 2 shows, in rear view from beneath, a tanker aircraft 20, configured for co-operating with the receiver aircraft 1 of FIG. 1 in order to enable in-flight refuelling of the receiver aircraft 1. In particular, the tanker aircraft 20 comprises, according to one embodiment of the present invention, a first signal source 22 and a second signal source 24, for example a first signal source and a second signal source of an active type, configured for issuing a light signal. The first and second signal sources 22, 24 are, for example, formed by optical devices configured for issuing a signal in the spectrum of the visible and/or of the infrared. This embodiment presents the advantage of requiring minimal modifications to the tanker aircraft 20 that can be made also to already existing tanker aircraft 20 in an economically advantageous way, requiring minimal modifications to existing tanker aircraft 20.

According to a further embodiment of the present invention the first and second signal sources 22, 24 are formed by the beacon/position lights normally present on any aircraft. This embodiment presents the advantage of not requiring any modification of a structural nature or any other nature to the tanker aircraft 20.

According to a further embodiment of the present invention, the first and second signal sources 22, 24 are sources of a passive type. In this case, the signal sources 22, 24 do not issue a light radiation but, for example, reflect the light of the surrounding environment.

The first and second signal sources 22, 24 are set on the fuselage of the tanker aircraft 20 in a lower portion of the fuselage in such a way as to be identifiable by a receiver aircraft 1 that approaches the tanker aircraft 20 from behind and at an altitude of flight lower than the altitude of flight of the tanker aircraft 20. The first and second signal sources 22, 24 are spaced apart by a distance d chosen on the basis of the type of signal sources 22, 24 used, for example, in the case of focused light signal sources of a LED type, greater than 70 cm, preferably 1 m. The tanker aircraft 20 further comprises: a transmitter device 26 of its own, configured for communicating in transmission with the transceiver device 6 of the receiver aircraft 1; a positioning device 28, for example a GPS receiver; and a microcontroller 30, connected to the transceiver device 26 and to the positioning device 28. The first and second signal sources 22, 24 can be switched on manually by an operator present on board the tanker aircraft 20 only when necessary (i.e., during the operations of in-flight refuelling).

Figure 3:
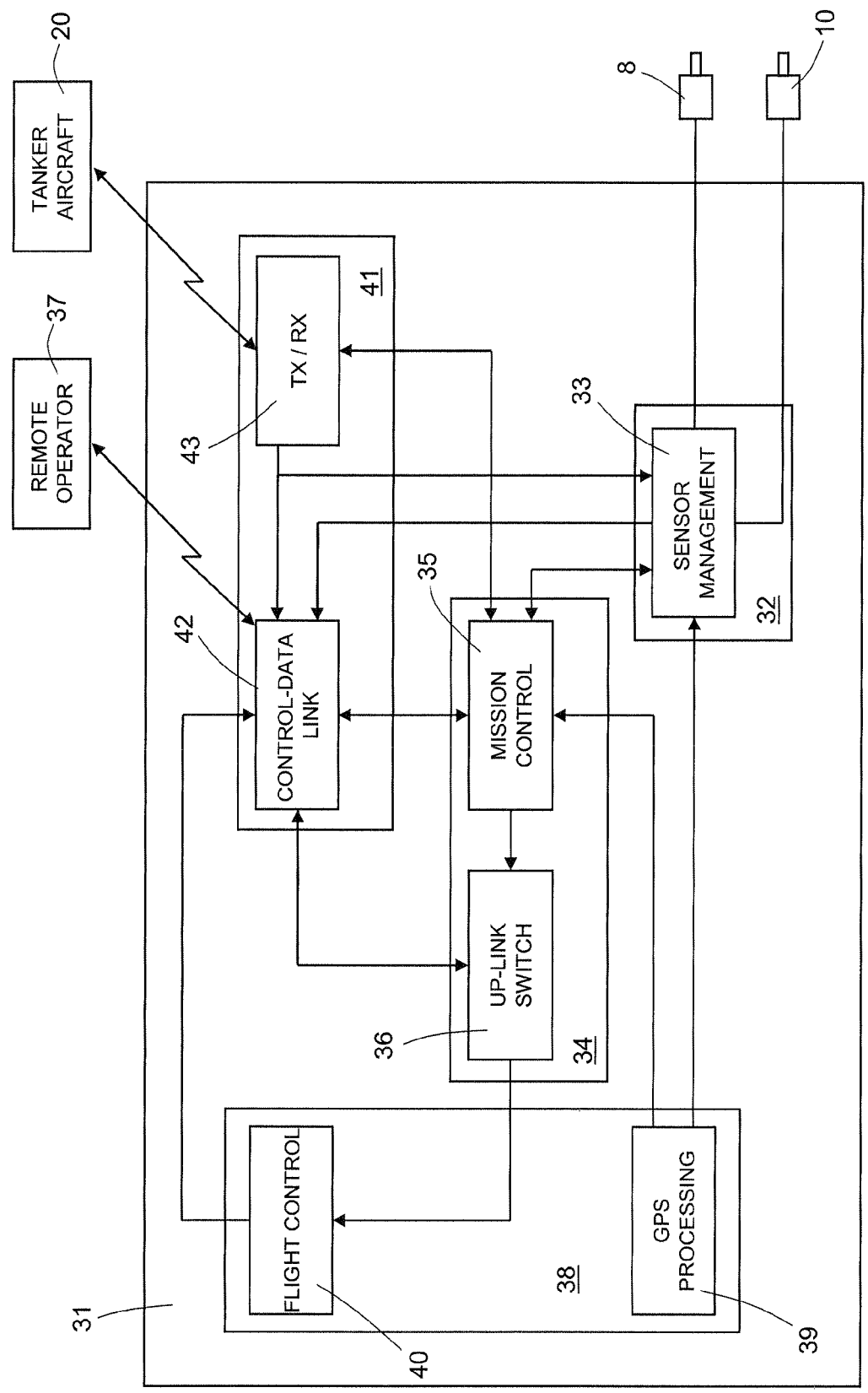
FIG. 3 shows, by means of a block diagram, modules for managing the automatic-piloting system according to the present invention.

FIG. 3 shows a schematic representation, by means of functional blocks, of management modules (designated as a whole by the reference number 31) of the automatic-piloting system 15 of the receiver aircraft 1 according to the present invention. The management modules 31 can be of a software type, stored within the memory 12 and executed by the microprocessor 14, or implemented in a distributed way within appropriate memories (not illustrated) of the positioning device 4, of the transceiver device 6, and of the autonomous flight device 2 (or of the integrated digital processor, if present).

The management modules 31 comprise a block for measuring the approach in flight 32, including a sensor-management module 33, of a software type, configured for governing acquisition of images through the first and second optical devices 8, 10 and processing them (as will be explained more fully hereinafter); a mission-management block 34, including a mission-control module 35, configured for imparting flight commands and/or mission commands to the receiver aircraft 1 (for example, by governing the autonomous flight device 2 so as to execute manoeuvres necessary for reaching the area prearranged for rendez-vous and execution of in-flight refuelling), and an uplink-switch module 36, configured for temporarily inhibiting the mission-control module 35 on the receiver aircraft 1 and enabling the pilot to govern the receiver aircraft 1 manually; a flight-management block 38, including a GPS-processing module 39, configured for receiving one or more GPS-position signals coming from one or more satellites of the GPS and processing them in order to identify position co-ordinates of the receiver aircraft 1, and a flight-control module 40, configured for receiving, via the uplink-switch module 36, the flight commands (course, direction, etc.) generated by the mission-control module 35 or received by the pilot; and a communication block 41, including a transmitter/receiver module 43, configured for enabling communication in reception with the transmitter device 26 of the tanker aircraft 20 (for example, for receiving GPS position data of the tanker aircraft 20) and a control-data-link module 42, configured for enabling exchange of command and control data of the receiver aircraft 1 between the receiver aircraft 1 itself and a remote station 37 (in which the remote pilot operates).

In use, the first and second optical devices 8, 10 operate for acquiring images of the tanker aircraft 20, in particular when the receiver aircraft 1 is in the spatial proximity of the tanker aircraft 20. The spatial proximity of the receiver aircraft 1 to the tanker aircraft 20 is detected by detection of position data (for example, azimuth, elevation, relative distance) of the receiver aircraft 1 and of the tanker aircraft 20 via the respective positioning devices 4 and 28, and by comparison of said position data detected. The comparison of said position data is effected by the receiver aircraft 1. For the purpose, the GPS-processing module 39 is connected to the mission-control module 35, which is instead connected to the transmitter/receiver module 43. The transmitter/receiver module 43 (for example, implemented in the transceiver device 6) acquires GPS position data of the tanker aircraft 20 transmitted by the transceiver device 26 and communicates them to the mission-control module 35. The latter, on the basis of the GPS position data of the receiver aircraft 1 (acquired by the GPS-processing module 39) and of the GPS position data of the tanker aircraft 20 received by the transmitter/receiver module 43, identifies the relative positions of the aircraft 1 and 20. The mission-control module 35 is connected to the sensor-management module 33 and is configured for governing, via the sensor-management module 33, acquisition of images by the first and second optical devices 8, 10. The images acquired by the first and second optical devices 8, 10 are converted into digital format and processed by the sensor-management module 33 in order to carry out an operation of recognition of the subject of said images. In particular, this operation is aimed at recognizing, during the step of approach of the receiver aircraft 1 to the tanker aircraft 20, the type of tanker aircraft 20 that is approaching, and then detecting the position of the first and second signal sources 22, 24 of the tanker aircraft 20. In this way, it is possible to detect signal sources 22, 24 both of an active type and of a passive type.

Image recognition can be effected by means of software of a known type, by comparing the images captured with a plurality of images present in a database, for example stored in the memory 12, as described more fully in what follows.

It is thus possible to carry out a fine approach and complete the correct positioning of the receiver aircraft 1 with respect to the tanker aircraft 20 for carrying out in-flight refuelling.

The measurements of position via GPS, the operations of recognition of the tanker aircraft 20, and the detection of the position of the first and second signal sources 22, 24 can be executed continuously and simultaneously; i.e., they are not mutually exclusive.

Figure 4:
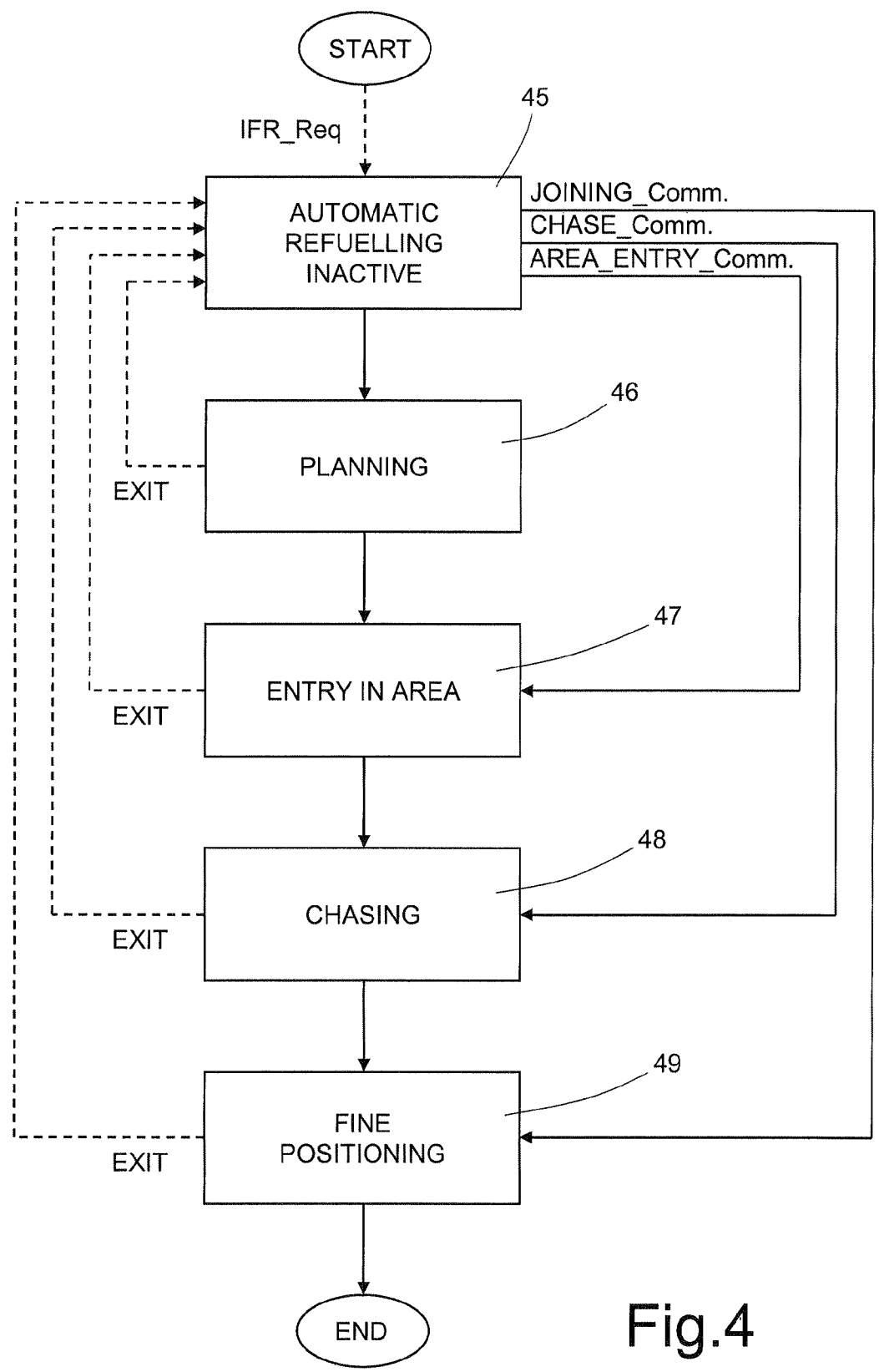
FIG. 4 shows, by means of a flowchart, successive steps of a method of approach of the aircraft of FIG. 1 to a rendez-vous area and of approach to the tanker aircraft of FIG. 2 with purposes of in-flight refuelling according to the present invention.

FIG. 4 shows, by means of a block diagram, steps 45-49 of planning of the operation of approach of the receiver aircraft 1 to the tanker aircraft 20 managed by the management modules of FIG. 3. Transitions between steps performed autonomously by the management modules 31 are represented in FIG. 4 by solid-line arrows, whereas any possible manual intervention on the part of the pilot, aimed at modifying the automatic flow between the steps, are represented by dashed arrows. In the case of no intervention on the part of the pilot, the receiver aircraft 1 would be guided in a totally automatic and autonomous way by the management modules 31 up to completion of the refuelling operation.

Activation of the steps of approach for executing the operation of in-flight refuelling can made automatically (for example, upon detection of a minimum-fuel condition) or following upon an intervention of manual activation on the part of the pilot (command IFR_Req in FIG. 4).

During the step 45, the mission-control module 35 is in an inactive autonomous refuelling step, and the management of in-flight refuelling is of a manual type, entrusted to the pilot. The step 45 is executed, for example, during take-off, when there is no need to carry out refuelling, or when, for reasons of safety, the pilot deems it necessary to govern the receiver aircraft 1 manually. Activation of step 45 is made via direct command of the pilot, who, by communicating with the management modules 31 via the transmitter/receiver module 43 governs the uplink-switch module 36 via the control-data-link module 42 in such a way as to inhibit automatic control of the flight-control module 40 by the mission-control module 35.

In the absence of manual control by the pilot, and in the case where in-flight refuelling is necessary (detected automatically or governed by the remote operator via the command IFR_Req), control passes from step 45 to step 46, of mission planning. During this step, the mission-control module controls, via the uplink-switch module 36, the flight-control module 40, for governing the course of flight of the receiver aircraft 1 towards the rendez-vous area. In particular, on the basis of the current co-ordinates of flight position (detected automatically via the instruments proper of the autonomous flight device 2), the mission-control module 35 governs the flight-control module 40 in such a way as to impart to the receiver aircraft 1 the commands necessary for carrying out deviations of course, accelerations, decelerations, or else adoption of a more tortuous path in order to make up for conditions of delay/advance with respect to a possible rendez-vous schedule envisaged.

Then, when the receiver aircraft 1 enters the area envisaged for the rendez-vous (known on the basis of the GPS position data continuously monitored), control passes to step 47, of entry into the area. During this step, the mission-control module 35 governs the receiver aircraft 1 so that the latter will effect, if necessary, one or more turns of fixed radius ("loitering"), awaiting the arrival of the tanker aircraft 20 in the rendez-vous area. Upon arrival of the tanker aircraft 20 in the rendez-vous area, control passes to step 48. In the case where the tanker aircraft 20 is already in the rendez-vous area, step 47 does not produce any effect on the flight of the receiver aircraft 1, and control passes to step 48.

Figure 6:
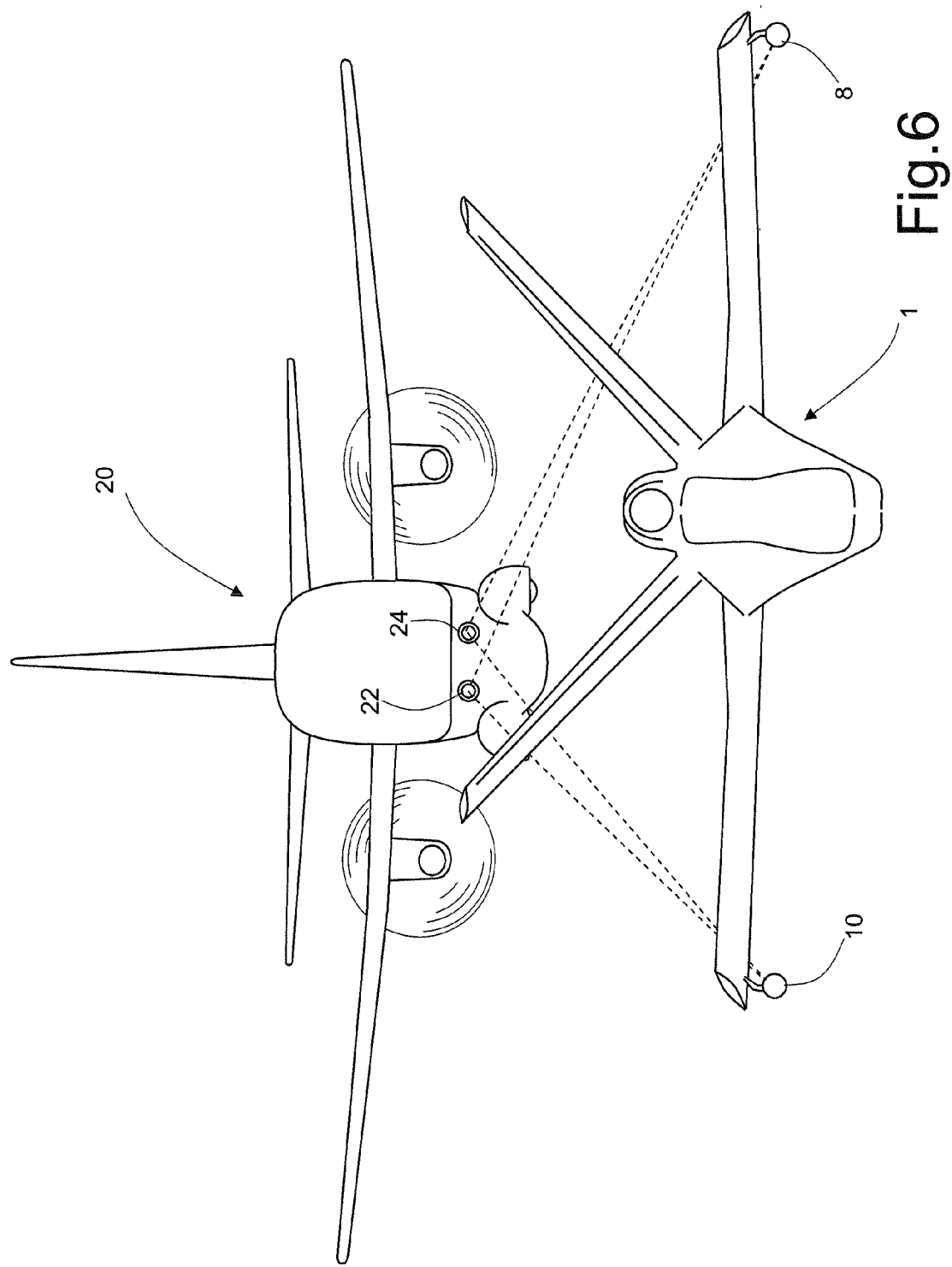
FIG. 6 shows the receiver aircraft of FIG. 1 during a step of approach to the tanker aircraft of FIG. 2.

During step 48, which regards the chasing manoeuvre, the mission-control module 35 governs, via the flight-control module 40, the receiver aircraft 1 so that the latter will effect the manoeuvres necessary for positioning itself on the tail of the tanker aircraft 20 (as illustrated in FIG. 6 and described hereinafter with reference to said figure), for preparing for in-flight refuelling. The procedures used can be advantageously developed in accordance with the NATO ATP 56 standard.

The correct position of the receiver aircraft 1 on the tail of the tanker aircraft 20 is verified by the mission-control module 35 by means of a comparison of the position co-ordinates of the receiver aircraft 1 obtained through GPS and of the co-ordinates of the tanker aircraft 20 received by the latter through the transmitter/receiver module 43. During step 48, the mission-control module 35 imparts to the receiver aircraft 1 commands of acceleration or deceleration such as to enable a progressive reduction of the distance from the tanker aircraft 20 and possible commands of change of direction (for example turns) or of modification of the altitude of flight (for example, starting from 1000 feet—approximately 300 meters—lower than the altitude of flight of the tanker aircraft 20) for positioning in conditions of safety on the tail of the tanker aircraft 20.

Finally (step 49), a fine positioning of the receiver aircraft 1 is effected to enable engagement with the refuelling systems (of a known type and not illustrated) provided on the tanker aircraft 20. During this step, the distance between the receiver aircraft 1 and the tanker aircraft 20 and the difference of altitude between the two are gradually reduced, until a pre-set spatial position is reached for carrying out in-flight refuelling (depending upon various parameters, amongst which the type of tanker aircraft, and the length of the pipe, rigid or flexible, used for refuelling, etc.). The control of the distance between the receiver aircraft 1 and the tanker aircraft 20 in this case is effected both by analysing the GPS position datum and by processing the images captured by means of the optical devices 8, 10 (as will be explained more fully hereinafter with reference to FIG. 5).

Each of the steps 45-49 can be interrupted by the remote operator (command EXIT from each step), to bring the mission-control module 35 back into the inactive state of automatic refuelling of step 45. Then, control can again pass to step 46, or else, via a command of the pilot, skip directly to step (command AREA_ENTRY_Comm), or else to step 48 (command CHASE_Comm), or else to step 49 (command JOINING_Comm).

The command EXIT from each step 46-49 causes an interruption of the current step and appropriate changes of direction of the receiver aircraft 1 such as to prevent a possible collision with the tanker aircraft 20 if the latter is in the spatial proximity thereof (for example, in the case of exit from step 49, the receiver aircraft 1, being particularly close to the tanker aircraft 20, is governed in diving, and its course is governed in a direction opposite to that of the tanker aircraft 20).

Figure 5:
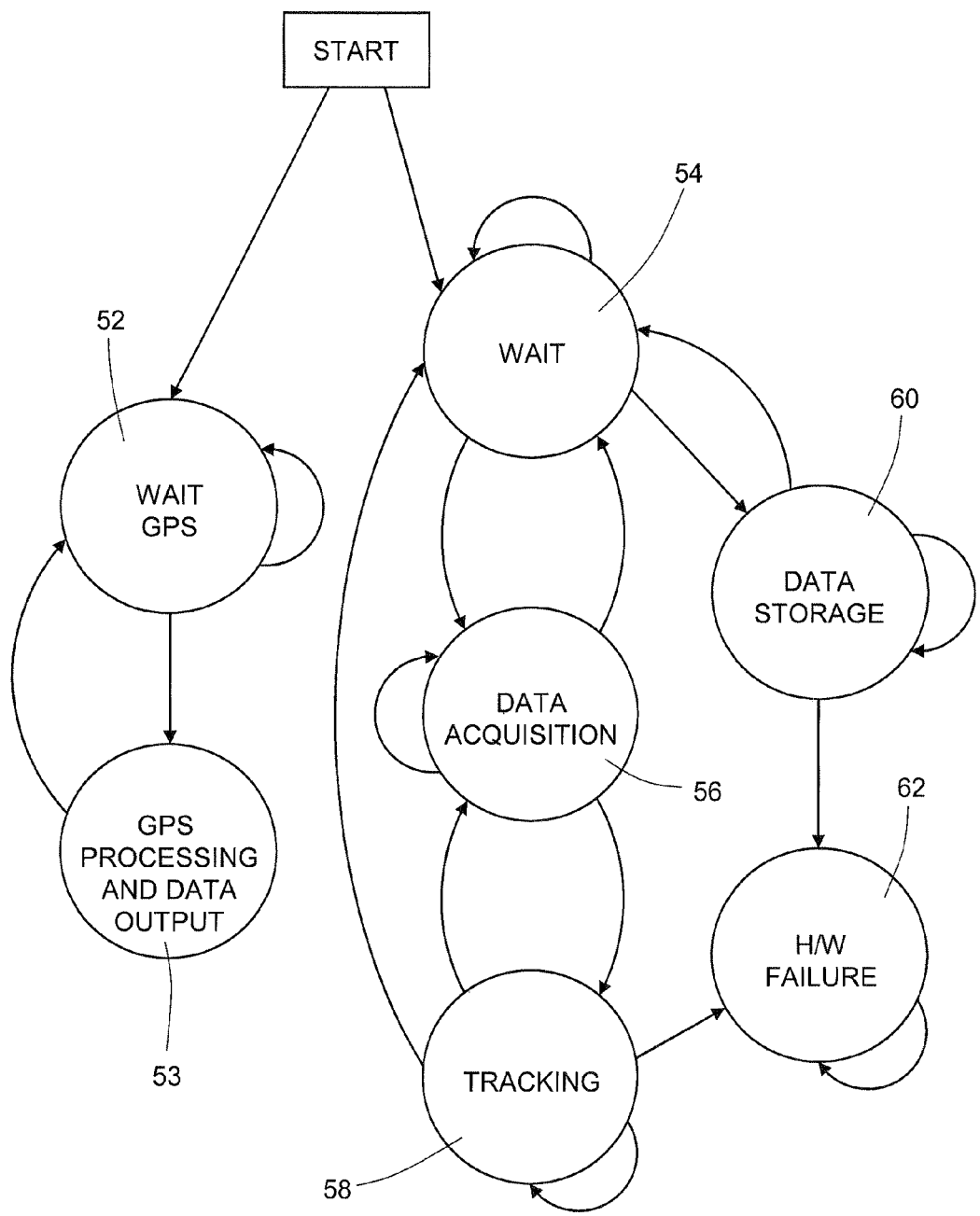
FIG. 5 shows, by means of a statechart diagram, states assumed by the management modules of FIG. 3.

FIG. 5 shows a statechart diagram that illustrates operation of the block for measuring the approach in flight 32, in particular during steps 48 and 49 of FIG. 4.

The sensor-management module 33 is kept in a wait state 54 (not operative, in which the video cameras are not governed for image acquisition) until arrival of a corresponding activation command (for example, a few instants after take-off or when a given altitude of flight is reached, then to pass to a data-acquisition state 56, in which the first and second optical devices 8, 10 are functioning for image acquisition). The GPS-processing module 39 is, however, already operative and in use, and passes alternately from a wait state 52 (in which the GPS position data are not processed, for example because they are not received on account of adverse meteorological conditions or temporary obscuration of the GPS satellites) to a GPS processing state 53 (during which the GPS signal is received correctly). Hence, only in the case where the GPS position signal is missing or is considered not reliable, does it enter the wait state 52.

To return to the sensor-management module 33, the latter governs the first and second optical devices 8 and 10 for image acquisition in a continuous way for identifying at any moment, but above all when the receiver aircraft 1 is in the vicinity of the tanker aircraft 20, the presence of the tanker aircraft 20. In the first place, the spatial vicinity between the receiver aircraft 1 and the tanker aircraft 20 is judged by the receiver aircraft 1 on the basis of a comparison between the GPS position data detected by the orientation device 26 of the tanker aircraft 20 (and transmitted to the receiver aircraft 1) and the GPS position data detected by the orientation device 6 and by the GPS-processing module 39 of the receiver aircraft 1.

During the state 56, the sensor-management module 33 co-operates with the mission-control module 35 for identifying the tanker aircraft 20 from which to carry out refuelling. The position data of the receiver aircraft 1 and the position data of the tanker aircraft 20 are continuously updated and compared with one another to define a degree of confidence of the images captured by the optical devices 8, 10 and/or for carrying out a correction of the direction of flight of the receiver aircraft 1. In the proximity of the tanker aircraft 20, it is highly likely that the images captured regard the tanker aircraft 20 itself; instead, at a distance from the tanker aircraft 20, possible images captured by the optical devices 8, 10 could regard unknown aircraft or other elements.

Once an acceptable degree of confidence has been reached (for example higher than a certain pre-set threshold), control passes from the data-acquisition state 56 to the tracking state 58. In the tracking state 58 the images acquired by the first and second optical devices 8, 10, converted into digital signals, are processed by means of image-recognition algorithms for carrying out an automatic recognition of the type of the tanker aircraft 20. The automatic recognition of the tanker aircraft 20 from which refuelling is to be carried out can occur by means of image-recognition software of a known type and for example comprises the following steps. First of all, it is possible to execute on the images captured an operation of correction of defects originated by the optical devices 8, 10 themselves and of reduction of the noise of the image. For example, a matrix of correction operators can be used, that can be adapted according to the quality of the image. These can include radiometric corrections or corrections of homogeneity, for reducing the phenomenon of distortion or of degradation of the levels of colour or of grey, or apply a filtering of a Gaussian type for reducing high-frequency noise. For known defects of a fixed type, it is likewise possible to envisage the use of a predefined correction mask. Next, the filtered images thus obtained can be processed in such a way as to extract the contours of the elements represented in said filtered images, defined by a certain number of resolution pixels, using graphic processing techniques of a known type. The contours thus obtained (defined on the basis of the number of resolution pixels) can be easily compared with contour models previously stored in an appropriate database, for example stored in the memory 12 of the receiver aircraft 1. The contour models stored can regard portions and details of the tanker aircraft 20 (used for images captured in the proximity of the tanker aircraft 20), or its overall shape (used for images of the tanker aircraft 20 captured from a distance, which hence identify the entire shape or contour of the tanker aircraft 20). As an alternative or in addition to what has been said, it is possible to equip the tanker aircraft 20 with appropriate physical recognition features, known to the receiver aircraft 1, in such a way as to limit the steps of processing of the images to identification of said recognition features.

By way of example, provided herein is a list of the possible portions of the tanker aircraft 20 that can be used (individually or a plurality thereof) for the purposes of recognition. For example, it is possible to consider the wingspan, the dimensions of the tailplane (width and height thereof), the position of the engines with respect to each respective wing, the width of the fuselage, with special attention paid to the thickness thereof in proportion to the wingspan according to a rear view, the length of the aircraft in side view, i.e., the nose-tail length. The expected contour characteristics for said portions of the tanker aircraft 20 can be catalogued for this purpose in the preset database from a plurality of different angles and different distances.

The comparison of each recognition contour or feature detected with the recognition contours or features stored in the database yields a result of comparison associated to a confidence value of said result. Said confidence value can, for example, be obtained using a distribution of a Gaussian type, for example a 2-sigma Gaussian distribution, known in the literature.

It is evident that the contours stored in the database can be stored in the most appropriate way, for example in the form of matrices. Likewise, also the contours extracted from the images captured by means of the optical devices 8, 10 can be encoded in matrix form, to render the step of comparison as fast and certain as possible.

If the steps described for the recognition yield a negative result (the expected tanker aircraft 20 has not been recognized) control returns into the data-acquisition state 56. Otherwise, a value of distance between the receiver aircraft 1 and the tanker aircraft 20 is determined on the basis of the recognition contours and/or features detected. It is in fact possible to provide an estimate of the distance between the receiver aircraft 1 and the tanker aircraft 20 on the basis of the apparent dimensions of the recognition contours and/or features detected (i.e., the dimensions of the recognition contours and/or features as detected by the optical devices 8, 10). The estimate of distance thus obtained can be compared with the distance datum obtained via GPS or else be used for compensating any possible intrinsic inexactitude in the GPS (further details as regards compensation of the errors of the GPS datum are provided hereinafter).

On the basis of the GPS data and of the measurement of the distance from the tanker aircraft 20 effected by means of the first and second optical devices 8, 10, the receiver aircraft 1 sets itself on the tail of the tanker aircraft 20, at an altitude of flight lower than that of the tanker aircraft 20, for the refuelling operation, as illustrated in FIG. 6. Since the steps of final approach are particularly delicate given the short distance between the two aircraft 1, 20 (the aim being to prevent any collision between them), the use of the GPS data and of the estimate of distance supplied by the optical devices 8, 10 as described are unable to supply to the autonomous flight device 2 a datum that is sufficiently reliable to enable approach in conditions of safety. Consequently, for distances between the receiver aircraft 1 and the tanker aircraft 20 of less than approximately 200 m, the mission-control module 35 remains in the tracking state 58, but the identification of the distance between the receiver aircraft 1 and the tanker aircraft 20 is effected by detecting preferably the signals (for example, as has been said, light signals in the visible or in the infrared, according to the optical devices 8, 10 used) emitted by the first and second signal sources 22, 24. Since the distance d between the first and second signal sources 22, 24 is known, it is possible, via triangulation, to process a given relative distance between the receiver aircraft 1 and the tanker aircraft 20 with high precision, and the autonomous flight device 2 can govern the receiver aircraft 1 in fine approach to the tanker aircraft 20 and in appropriate alignment for carrying out the operation of in-flight refuelling.

The operation of triangulation is made possible by the knowledge of the angles comprised between the extremes of the ideal straight line that joins the first and second signal sources 22, 24 and the respective ideal straight lines that join the first and second signal sources 22, 24 to the optical devices 8, 10. These data are obtained from the values of: azimuth, elevation, and relative distance between the aircraft 8, 20 (obtained, preliminarily, from the position data detected via GPS), on the basis of the distance, which is known, between the first and second optical devices 8, 10; the position, which is known, of installation of the optical devices 8, 10; the attitude of flight of the receiver aircraft 1; the distance d between the first and second signal sources 22, 24 set on the tanker aircraft 20; and the position of the first and second signal sources 22, 24 on the image acquired by means of the first and second optical devices 8, 10 (for example, in the case where the latter are video cameras or photographic cameras). To obtain correct values it is expedient to calibrate the first and second optical devices 8, 10 on the ground, verifying the angle of aperture for capturing images of each of them using appropriate optical targets.

Once an optimal relative position of the two aircraft 1 and 20 is reached, it is possible to proceed with the step of in-flight refuelling (the details regarding the procedures of refuelling as such are not described herein in so far as they do not form part of the present invention).

At the end of the operations of in-flight refuelling, the receiver aircraft 1 can abandon the rendez-vous area. The tracking state 58 is then abandoned, and the mission-control module 35 returns to the wait state 54 or to the data-acquisition state 56. Exit from the tracking step can moreover be caused by a loss of the images by one or both of the optical devices 8, 10. In this case, exit from the tracking state 58 takes to the data-acquisition state 56, to return to the tracking state 58 as soon as an image that could belong to the tanker aircraft 20 is again captured (for example, when in one and the same image there are present elements with a marked contrast with respect to one another).

To return to FIG. 5, the sensor-management module 33 can pass from the wait state 54 also to an image-storage state 60. The passage from the wait state 54 to the image-storage state 60 can occur in parallel with passage from the wait state 54 to the data-acquisition state 56 and does not interfere therewith.

During the image-storage state 60, the sensor-management module 33 stores (for example, in the memory 12) images acquired during permanence in the data-acquisition state 56.

In the case of detection of malfunctioning in any the management modules 31, both from the tracking state 58 and from the data-storage state 60 control passes to the hardware-failure state 62. If the hardware-failure state 62 persists, automatic in-flight refuelling is interrupted and the pilot can continue refuelling manually or else interrupt the process.

Finally, it should be considered that the states 54, 56, 58 can be activated irrespective of the wait state 52 and the GPS processing state 53 (the latter are always active in alternation according to the condition of reception of the GPS signal).

To guarantee an estimate of the distances between the receiver aircraft 1 and the tanker aircraft 20 as correct as possible, the distance datum detected via GPS is continuously integrated and compared with the distance datum calculated on the basis of the images acquired via the optical devices 8, 10.

In practice, the processing rate of the video signal is much higher than the processing rate of the GPS signal used by common GPS reception systems (a ratio for example of approximately 30:1). There is consequently the need to guarantee at each instant a predictive value of the position of the tanker aircraft 20 such as to cover the periods of time during which the datum deriving from the optical devices 8, 10 is available, but the GPS datum is not. Similar considerations apply also in those conditions in which the GPS signal is degraded or absent.

For this purpose, assigned to each position value (in particular, of distance between the receiver aircraft 1 and the tanker aircraft 20) detected via the GPS-processing module 39, is a reliability factor $C_{GPS}$ of the GPS datum. As is known, a reliability factor regards the accuracy of a measurement, and indicates the error or lack of reliability, or uncertainty of said measurement with respect to the so-called "true value" or "true score". By way of example, a generic measured value $M_0$ is given by $M_0 = M_T \pm e$, where $M_T$ is the true value and e is the error.

The reliability factor $C_{GPS}$ of the GPS datum is based upon a plurality of parameters, namely: a precision parameter $C_P$, based upon the parameter known as DOP ("Dilution Of Precision"), for example the HDOP ("Horizontal Dilution Of Precision"), provided by GPS reception apparatuses of a known type and representing an estimate of the precision of the GPS position datum; an uncertainty parameter $C_{ERR}$, representing the uncertainty on the GPS position datum; a parameter $C_{SAT}$, depending upon the number of satellites used for calculation of the GPS position datum; a delay parameter $C_D$, depending upon the delay with which the GPS position datum is updated; and a parameter of distance from the tanker aircraft 20 as detected through the processing of the images captured by the optical devices 8, 10.

In greater detail, the precision parameter $C_P$ is obtained by means of the following formula (1):

$$C_P = (6 - HDOP)/6 \tag{1}$$

where HDOP is the parameter of "Horizontal Dilution of Precision", and is not valid for values smaller than or equal to zero (it would not be a reasonable value) or else higher than or equal to 6 (value considered extremely, poor in qualitative terms). In both cases of invalidity, the GPS datum is rejected and not considered for subsequent processing. Values considered good for the precision parameter $C_P$ are comprised between 1 and 2.

Figure 7:
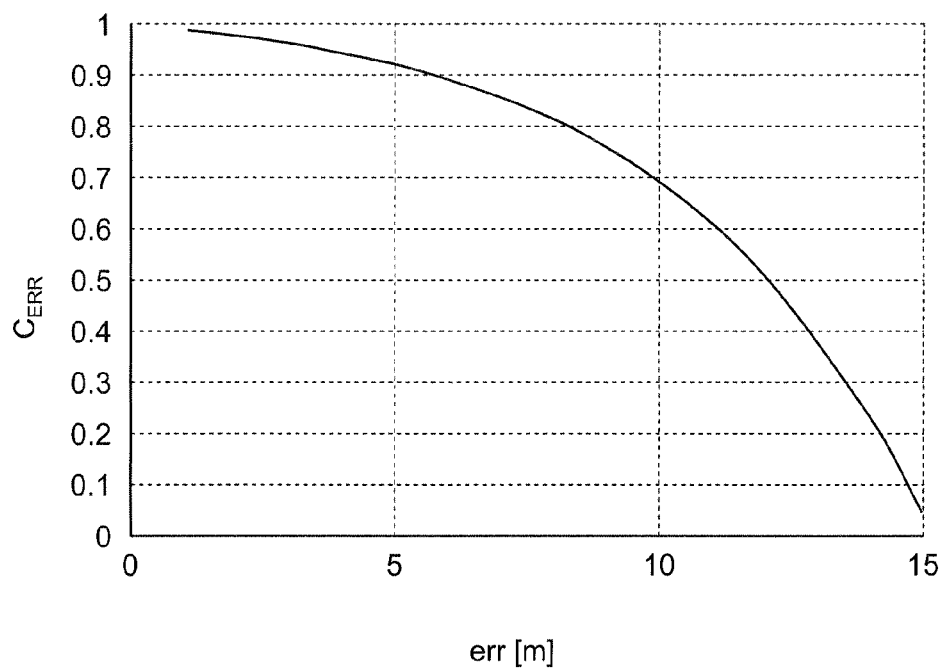
FIG. 7 shows the plot of a parameter representing the uncertainty on the GPS position data as a function of the prediction error, in meters, on the GPS position data.

The uncertainty parameter $C_{ERR}$ is given by the following formula (2)

$$C_{ERR} = 1 - e^{-\tau(max\_e - err)} + e^{-\tau \cdot max\_e} \tag{2}$$

where the term err designates the prediction error (in meters) on the GPS position datum, $\tau$ is a time constant, having a value for example of 0.21, and max_e is the maximum admitted prediction error, for example fixed at 15 m. On the basis of the formula (2), the plot of the uncertainty parameter $C_{ERR}$ as a function of the term err (prediction error) is illustrated in FIG. 7.

The parameter $C_{SAT}$ assumes a value comprised between 0 (very low value) and 5 (optimal value in so far as it is detected on the basis of a large number of GPS satellites). The ensuing Table 1 illustrates a possible choice of the value to be assigned to the parameter $C_{SAT}$ on the basis of the number of satellites available:

TABLE 1

| | Number of Satellites | | |
|---|---|---|---|
| | ≤2 | 3 | ≥4 |
| $C_{SAT}$ | 0 | 2 | 5 |

The delay parameter $C_D$ is given by the following formula (3):

$$C_D = 1 - e^{-\tau(n - t_D)} + e^{-\tau n} \tag{3}$$

where: $t_D$ identifies the delay with which the GPS position datum is updated; $\tau$ is a time constant, having a value for example of 0.8; and n is the maximum admitted delay time, having a value for example of 4 s.

Considering that the GPS datum is updated with a frequency of approximately 1 Hz, it is deemed expedient to consider a GPS datum as invalid after three absent GPS position values (lack of GPS signal) or for three consecutive values of the parameter $C_{SAT}$ equal to zero.

Figure 8:
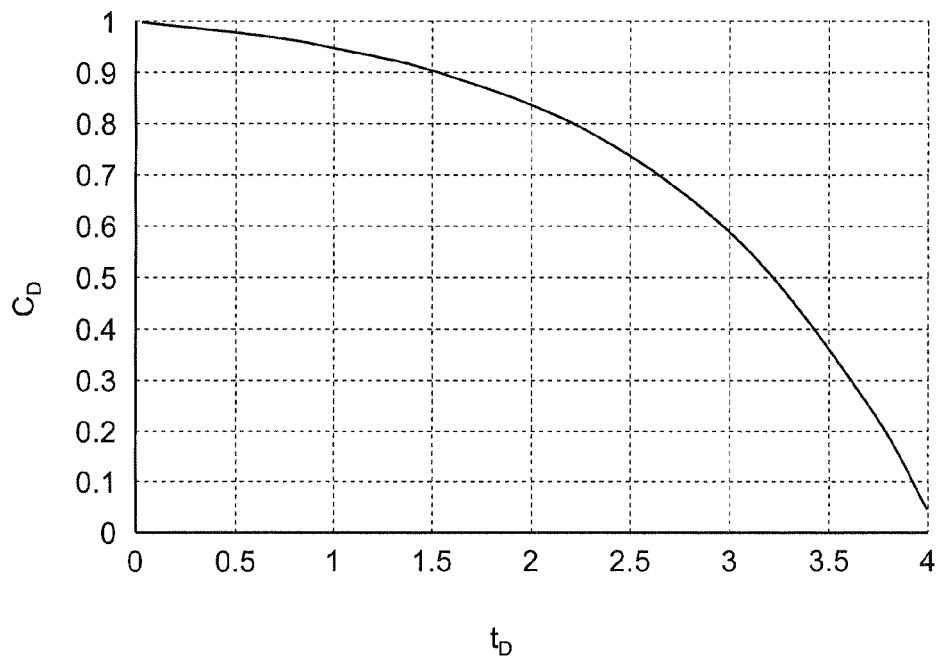
FIG. 8 shows the time plot of a delay parameter depending upon the delay with which the GPS position data is updated.

The plot of the delay parameter $C_D$ as a function of the time $t_D$ is illustrated in FIG. 8.

Using the formulae (1)-(3), a precision parameter $C_{P\_T}$, an uncertainty parameter $C_{ERR\_T}$, a parameter $C_{SAT\_T}$, and a delay parameter $C_{D\_T}$ are calculated for the tanker aircraft 20. Likewise calculated for the receiver aircraft 1 are a precision parameter $C_{P\_R}$, an uncertainty parameter $C_{ERR\_R}$, a parameter $C_{SAT\_R}$, and a delay parameter $C_{D\_R}$. On the basis of the parameters thus calculated, there are calculated, by the receiver aircraft 1, reliability factors $C_{GPS\_T}$ and $C_{GPS\_R}$ of the GPS datum, which regard the GPS position datum of the tanker aircraft 20 and the GPS position datum of the receiver aircraft 1, respectively.

The reliability factor $C_{GPS\_T}$ for the tanker aircraft 20 is given by the following formula (4):

$$C_{GPS\_T} = \min\{C_{P\_T}, C_{ERR\_T}, C_{SAT\_T}, C_{D\_T}\}, \tag{4}$$

whilst the reliability factor $C_{GPS\_R}$ for the receiver aircraft 1 is given by the following formula (5):

$$C_{GPS\_R} = \min\{C_{P\_R}, C_{ERR\_R}, C_{SAT\_R}, C_{D\_R}\} \tag{5}$$

The reliability factor $C_{GPS}$ is finally given by the following formula (6):

$$C_{GPS} = \min\{C_{GPS\_T}, C_{GPS\_R}\} \tag{6}$$

Since, as is known, the GPS position datum has an intrinsic error of the order of meters, it is not advisable to give priority to the measurement of the distance between the receiver aircraft 1 and the tanker aircraft 20 supplied by the GPS over the one obtained by means of the first and second optical devices 8, 10 (which is, in particular, supplied by the operation of triangulation in the steps of fine approach between the aircraft 1 and 20, for example for distances between them of less than 200 m).

However, also the measurement of distance between the receiver aircraft 1 and the tanker aircraft 20 obtained by processing the images captured by means of the optical devices 8, 10 may not be sufficiently precise above all if obtained starting from a triangulation effected at a great distance between the receiver aircraft 1 and the tanker aircraft 20 (for example, consistently with what has been previously described, greater than 200 m).

It is hence expedient to define a reliability factor $C_{OPT}$ for the measurement of optical distance made via the first and second optical devices 8, 10.

The reliability factor $C_{OPT}$ is calculated on the basis of a plurality of parameters, namely: a parameter $C_{acc}$ of accuracy of the distance between the receiver aircraft 1 and the tanker aircraft 20 (as detected through processing of the captured images); a value $C_U$ of uncertainty on the measurement (as detected through processing of the captured images); a parameter of reliability of the optical measurement $C_{COAST}$; and the state of processing of the captured images.

In detail, the accuracy parameter $C_{acc}$ is given by the following formula (7):

$$C_{acc} = \frac{L}{\alpha}(K_C \Delta + K_S) \tag{7}$$

where:

$$L = \sqrt{1+r^2}, \text{ and}$$

$$\alpha = 2\tan^{-1}\left(\frac{D}{2L}\right),$$

wherein r is the distance between the receiver aircraft 1 and the tanker aircraft 20 (as detected through the processing of the captured images); $\Delta$ is the uncertainty (root mean square—RMS) associated to the position of the tanker aircraft 20; D is a constant having a value for example of 4.5; $K_C$ is a constant having a value for example of 0.00015; and $K_S$ is a constant having a value, for example, of 0.0001.

Figure 9:
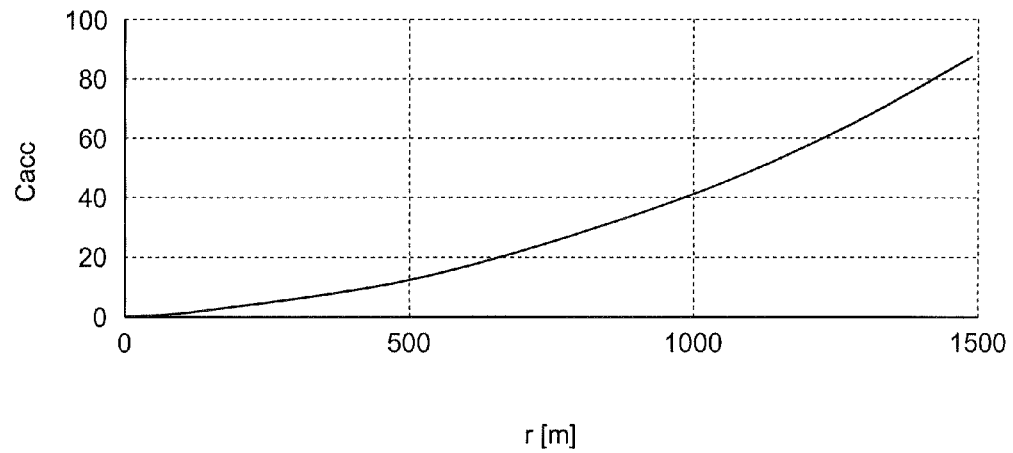
FIG. 9 shows the plot of an accuracy parameter of the distance between the receiver aircraft of FIG. 1 and the tanker aircraft of FIG. 2, as detected through processing of images of the tanker aircraft captured by the receiver aircraft, as a function of the distance.

FIG. 9 shows the plot of the accuracy parameter $C_{acc}$ as a function of the distance r.

On the basis of the accuracy parameter $C_{acc}$, the uncertainty value $C_U$ is given by the following formula (8):

$$C_U = -0.01(xC_{acc} - 100) \tag{8}$$

where x is an empirical coefficient having the function of refining the tolerance with the errors of measurement themselves and has a value, for example, of 1.

Figure 10:
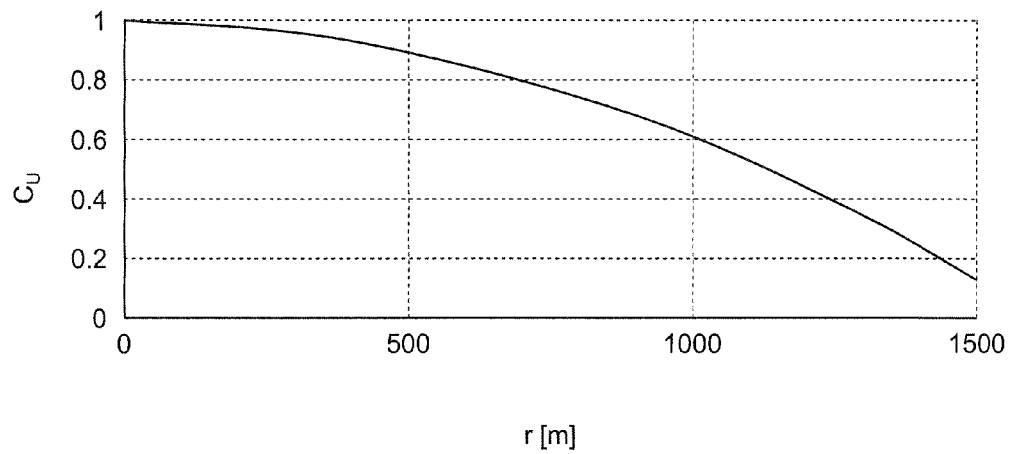
FIG. 10 shows the plot of a value of uncertainty in the measurement of distance between the receiver aircraft of FIG. 1 and the tanker aircraft of FIG. 2, as detected through processing of the images of the tanker aircraft captured by the receiver aircraft, as a function of the distance.

FIG. 10 shows the plot of the uncertainty parameter $C_U$ as a function of the distance r, with $\Delta$=0.5 and x=1.

The reliability parameter of the optical measurement $C_{COAST}$ is given by the following formula (9):

$$C_{COAST} = 1 - e^{-\tau(z-t_{COAST})} + e^{-\tau z} \tag{9}$$

where: $t_{COAST}$ is the age of the optical datum acquired and has a value comprised between 0 and 2, for example 0.5; $\tau$ is a time constant, having a value for example of 3; and z is the maximum admitted value of $t_{COAST}$, for example 2.

Figure 11:
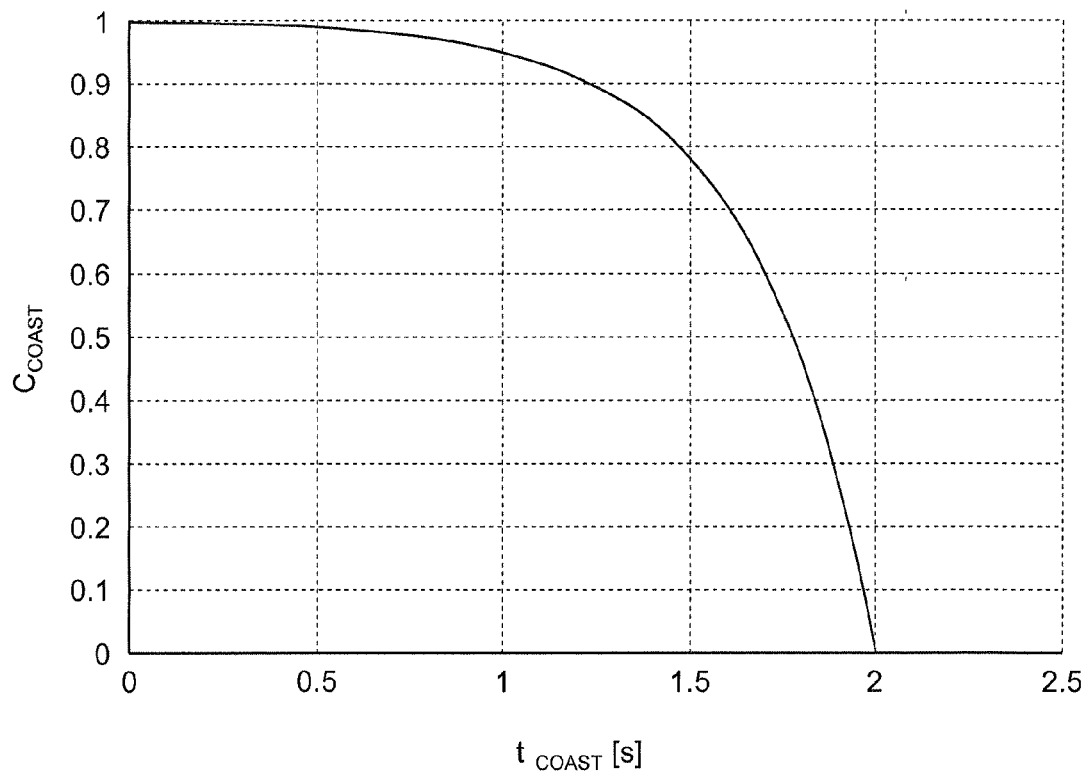
FIG. 11 shows the time plot of a reliability parameter of the optical measurement.

FIG. 11 shows the plot of the parameter of $C_{COAST}$ as a function of the value of $t_{COAST}$, with $\tau$=3 and z=2.

The recognition of the tanker aircraft 20 by the receiver aircraft 1 and the operation of triangulation carried out on the basis of the signals emitted by the first and second signal sources 22, 24 are performed on the basis of monoscopic visions (right-hand mono-vision for the images captured by the first optical device 8, and left-hand mono-vision for the images captured by the second optical device 10) and on the basis of a stereoscopic vision (using jointly the images captured by both of the optical devices 8, 10). Associated to the position of the tanker aircraft 20, calculated on the basis of the right-hand mono-vision, the left-hand mono-vision, and the stereoscopic vision, is a respective confidence factor $C_{IPR}$, $C_{IPL}$, $C_{IPS}$, each having a value of its own comprised between 0 (minimum confidence) and 1 (maximum confidence).

Finally, it is possible to define a global confidence factor $C_{RIGHT}$, $C_{LEFT}$, $C_{STEREO}$ respectively for the optical measurements of right-hand mono-vision (measurements of distance dist_R between the receiver aircraft 1 and the tanker aircraft 20 made by triangulation on the basis of just the data acquired by means of the first optical device 8), left-hand mono-vision (measurements of distance dist_L between the receiver aircraft 1 and the tanker aircraft 20 made by triangulation on the basis of just the data acquired by means of the second optical device 10), stereoscopy (measurements of distance dist_S between the receiver aircraft 1 and the tanker aircraft 20 made by triangulation on the basis of the data acquired by both the first and the second optical devices 8, 10 operating in stereoscopy) according to the formulae (10)-(12) appearing below.

The global confidence factor obtained via just the right-hand mono-vision is given by:

$$C_{RIGHT} = \min\{C_{U\_RIGHT}, C_{COAST\_RIGHT}, C_{IPR}\} \tag{10}$$

where $C_{U\_RIGHT}$ is the uncertainty value for the optical measurement of right-hand mono-vision calculated according to formula (8), and $C_{COAST\_RIGHT}$ is the reliability parameter of the optical measurement for the optical measurement of right-hand mono-vision calculated according to formula (9).

The global confidence factor obtained via just the left-hand mono-vision is given by:

$$C_{LEFT} = \min\{C_{U\_LEFT}, C_{COAST\_LEFT}, C_{IPL}\} \tag{11}$$

where $C_{U\_LEFT}$ is the uncertainty value for the optical measurement of left-hand mono-vision calculated according to formula (8), and $C_{COAST\_LEFT}$ is the reliability parameter of the optical measurement regarding the optical measurement of left-hand mono-vision calculated according to formula (9).

The global confidence factor obtained via stereoscopy is given by:

$$C_{STEREO} = \min\{C_{U\_STEREO}, C_{COAST\_STEREO}, C_{IPR}\} \tag{12}$$

where $C_{U\_STEREO}$ is the uncertainty value for the optical measurement in stereoscopy calculated according to formula (8), and $C_{COAST\_STEREO}$ is the reliability parameter of the optical measurement for the optical measurement in stereoscopy calculated according to formula (9).

The reliability factor $C_{OPT}$ is given by the highest between $C_{RIGHT}$, $C_{LEFT}$ and $C_{STEREO}$, according to the following formula (13):

$$C_{OPT} = \max\{C_{STEREO}, C_{RIGHT}, C_{LEFT}\} \tag{13}$$

Since for close-up measurements the GPS position datum yields a reliability lower than the position datum obtained via triangulation, it follows that it is expedient to introduce a threshold below which the value of distance between the receiver aircraft 1 and the tanker aircraft 20 obtained on the basis of the data acquired via GPS is considered unreliable. In particular, the distance data obtained on the basis of the data acquired via GPS can be rejected if: the presumed distance between the receiver aircraft 1 and the tanker aircraft 20

(detected, for example, via GPS and/or via processing of the images captured through the first and second optical devices 8, 10) is less than 200 m; the deviation detected between the measurement of distance obtained via GPS and by processing the images captured by means of the optical devices 8, 10 is greater than 3 m; the reliability factor $C_{GPS}$ is greater than zero; and the reliability factor $C_{OPT}$ of the measurement of distance obtained by processing the images captured by means of the optical devices 8, 10 is greater than 0.7.

When the conditions referred to above arise, the weight of the confidence value of the reliability factor $C_{GPS}$ is limited according to the following formula (14) to obtain a limited reliability factor $C_{GPS}'$:

$$C'_{GPS} = G_{GPS} - \delta, \quad (14)$$
$$\text{with } \delta = \frac{2}{3}C_{OPT} - 0.5.$$

Figure 12:
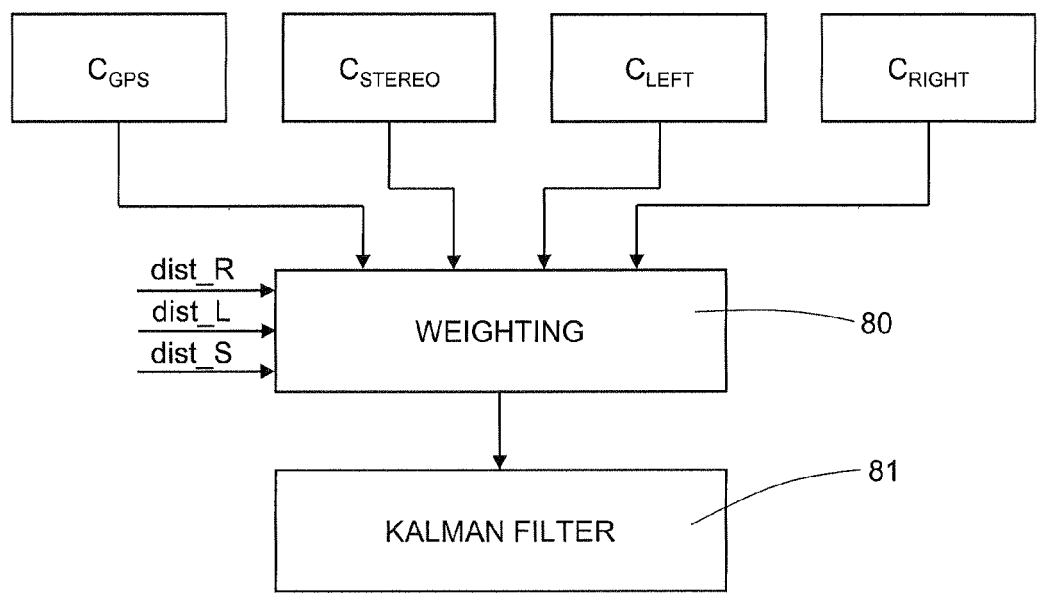
FIG. 12 shows, by means of a block diagram, steps of a process of weighting and filtering of distance data between the receiver aircraft of FIG. 1 and the tanker aircraft of FIG. 2 according to the present invention.

Hence, as represented schematically in FIG. 12, the reliability factor $C_{GPS}$ (or the limited reliability factor $C_{GPS}'$) of the GPS datum, the global confidence factor $C_{STEREO}$ for the optical measurements of stereoscopy, the global confidence factor $C_{LEFT}$ for the optical measurements of left-hand mono-vision, and the global confidence factor $C_{RIGHT}$ for the optical measurements of right-hand mono-vision are supplied at input to a weighting block 80 so as to be used as weights for defining a degree of reliability (likelihood of the information obtained being free from error) of the information of distance between the aircraft 1 and the aircraft 20 that is associated to said factors.

The weighting operation can, for example, comprise the step of supplying the global confidence factors $C_{LEFT}$ and $C_{RIGHT}$ in terms of percentage values indicating the probability that the measurement to which they refer is the "true" measurement understood as measurement free from error. A percentage value equal to 100% (which in practice cannot be achieved) indicates an error-free measurement, whereas a percentage value close to 0% indicates a measurement highly affected by error and probably unusable.

Each distance information associated to a respective global confidence factor forms weighted distance information. Said association is aimed at supplying a preferential indication of use of one position information with respect to another, and/or to establish a preferential importance for one or more position-information data with respect to others.

The weighted distance data obtained are then supplied at input to a filtering block 81, configured for calculating a conditional expected value of the relative position of the receiver aircraft 1 with respect to the tanker aircraft 20, conditioned with respect to the distance data between the aircraft 1 and the aircraft 20, which are preferably weighted (said distance data are obtained, as has been said, by processing the images captured by means of the optical devices 8, 10, to obtain the optical measurements of right-hand and left-hand mono-vision).

As is known from the fundamentals of probability and statistics, the expected value of a variable measured is based upon the measurement of probability P for that experiment. This measurement of probability is of a conditional type when it is conditioned on an event B for that experiment (with P(B)>0). The notation normally used to indicate the conditional expected value is E(P|B).

The operations described for the filtering block 81 can be executed in a known way by means of an operation of Kalman filtering. The operation of Kalman filtering yields at output a highly reliable value of distance between the receiver aircraft 1 and the tanker aircraft 20. On the basis of the value of distance thus obtained, the receiver aircraft 1 varies its own co-ordinates of flight and/or flight parameters (for example, the speed, the altitude, the attitude), for approaching the tanker aircraft 20 in conditions of safety and with high precision in an autonomous way (without, that is, the need for an intervention on the part of an operator) and keeping from the tanker aircraft 20 a useful and stable distance for the purposes of execution of an in-flight refuelling procedure.

From an examination of the characteristics of the invention obtained according to the present disclosure the advantages that it affords are evident.

In particular, the invention according to the present disclosure makes it possible to approach a generic target with high precision (at least at a centimeter level) using commercial hardware resources, hence limiting considerably the production costs.

Furthermore, since the procedure of approach between the aircraft is completely automatic, the workload of the pilot is considerably reduced. The present invention enables in fact management of all the steps of automatic in-flight refuelling, from the step of planning of the refuelling operation up to the final steps of chasing and fine positioning.

Finally, the tanker aircraft does not require any modification except for the possible installation of the first and second signal sources 22, 24 and of a GPS radio modem.

Finally, it is clear that modifications and variations may be made to the invention described and illustrated herein, without thereby departing from the sphere of protection of the present invention, as defined in the annexed claims.

For example, it is possible to use the system and the method described to keep a flight formation of unmanned aerial vehicles automatically cohesive, or for operations known as "sense and avoid" for unmanned aerial vehicles, enabling the aircraft in question to detect automatically (by means of the first and second optical devices 8, 10 and by processing the captured images as described) possible obstacles or non-cooperative aircraft present on its own course and then make appropriate changes of direction (for example turns) in order to prevent a collision.

In addition, the first and second signal sources 22, 24 may not be of a light type, but for example, be heat sources or sources of any other nature provided that they can be detected via the optical devices 8, 10 used. There may moreover be present more than two signal sources, for example a plurality of signal sources set in line with one another, or with positions staggered with respect to one another, or on a curved line.

Furthermore, the optical devices can be present in a number other than two (for example, in a way not illustrated, there may be present just one optical device or else three or more optical devices). The optical devices can finally be set in a portion of the receiver aircraft 1 other than the wings, for example on the tail, on the bow or, in general, on the fuselage.

In addition, the filtering block 81 can be configured for executing an operation of weighted average, using as weights the reliability factor $C_{GPS}$ (or the limited reliability factor $C_{GPS}'$) of the GPS datum, the global confidence factor $C_{STEREO}$ for the optical measurements of stereoscopy, the global confidence factor $C_{LEFT}$ for the optical measurements of left-hand mono-vision, and the global confidence factor $C_{RIGHT}$ for the optical measurements of right-hand mono-vision.

Finally, the operation of triangulation can be performed by means of time-of-flight optical devices (for example, time-of-flight laser devices, of a known type) or by means of optical triangulation devices (for example, optical triangulation laser devices, which are also of a known type), which are able to offer high levels of measurement precision.

The invention claimed is:

1. An automatic-piloting system configured for being arranged on a receiver aircraft for controlling an in-flight refuelling operation of the receiver aircraft, comprising:
    a first detector, arranged on the receiver aircraft and configured for acquiring first geometrical information associated to a first detection area and a second detection area belonging to a tanker aircraft, said first detection area being related to said second detection area by a geometrical relation known to the automatic-piloting system;
    a processor, configured for determining, on the basis of the first geometrical information acquired, first position information associated to a relative position of the receiver aircraft with respect to the tanker aircraft; and
    an automatic-pilot device coupled to said processor and configured for varying flight parameters of the receiver aircraft on the basis of the first position information.

2. The system according to claim 1, wherein the first detector comprises an optical device of a passive type.

3. The system according to claim 1, wherein said first detector and said processor are further configured for co-operating so as to acquire images of the tanker aircraft and to execute an operation of automatic recognition of said first and second detection areas.

4. The system according to claim 3, wherein said processor is further configured for executing an operation of automatic recognition of the tanker aircraft and/or of portions of the tanker aircraft.

5. The system according to claim 1, wherein said processor is moreover configured for determining said first position information by executing a first operation of triangulation on the basis of the first geometrical information acquired.

6. The system according to claim 1, further comprising a positioning device, configured for supplying position co-ordinates of the receiver aircraft and a transceiver device configured for receiving position co-ordinates of the tanker aircraft, and wherein the processor is moreover configured for calculating second position information of the receiver aircraft with respect to the tanker aircraft on the basis of said flight parameters of the receiver aircraft and of the tanker aircraft, said automatic-pilot device being configured for varying the flight parameters of the receiver aircraft on the basis of said first and second position information.

7. The system according to claim 6, wherein the processor is moreover configured for:
    associating a first reliability factor ($C_{RIGHT}$; $C_{LEFT}$), indicating the accuracy of the first position information, to the first position information, obtaining first weighted position information; and
    associating a second reliability factor ($C_{GPS}$), indicating the accuracy of the second position information, to the second position information, obtaining second weighted position information,
    said automatic-pilot device being configured for varying the flight parameters of the receiver aircraft on the basis of said first and second weighted position information.

8. The system according to claim 7, wherein the processor is moreover configured for calculating a conditional expected value of the relative position of the receiver aircraft with respect to the tanker aircraft conditioned with respect to the first and second weighted position information to obtain first filtered position information, said automatic-pilot device (2) being configured for varying the flight parameters of the receiver aircraft on the basis of said first filtered position information.

9. The system according to claim 8, wherein the processor, in order to calculate said conditional expected value, is configured for executing an operation of Kalman filtering.

10. The system according to claim 1, further comprising a second detector arranged on the receiver aircraft (1) and configured for acquiring second geometrical information associated to the first and second detection areas, said processor being further configured for:
    determining, on the basis of the first and second geometrical information acquired by means of the second detection means, third position information associated to a relative position of the receiver aircraft with respect to the tanker aircraft,
    said automatic-pilot device being configured for varying flight parameters of the receiver aircraft on the basis of the third position information.

11. The system according to claim 10, wherein said processor is further configured for executing a second operation of triangulation on the basis of the second geometrical information.

12. The system according to claim 10, wherein the first and second detectors are passive optical devices configured for operating in stereoscopy.

13. An automatic-piloting method for controlling in-flight refuelling operations of a receiver aircraft, comprising the steps of:
    detecting, via a first detector arranged on the receiver aircraft, first geometrical information associated to first and second detection areas belonging to a tanker aircraft, said first detection area being related to said second detection area by a geometrical relation known to the automatic-piloting system;
    determining, on the basis of the first geometrical information detected, first position information associated to a relative position of the receiver aircraft with respect to the tanker aircraft; and
    varying flight parameters of the receiver aircraft on the basis of the first position information.

14. The method according to claim 13, wherein the step of detecting first geometrical information comprises acquiring in a passive way one or more optical signals identifying said first detection area and/or said second detection area.

15. The method according to claim 14, further comprising the steps of:
    acquiring one or more images of the tanker aircraft and/or of portions of the tanker aircraft; and
    executing an operation of automatic recognition of the tanker aircraft and/or of portions of the tanker aircraft on the basis of said acquired images.

16. The method according to claim 13, wherein said step of determining comprises executing, by the receiver aircraft, a first operation of triangulation on the basis of the first geometrical information acquired.

17. The method according to claim 13, further comprising the steps of:
    acquiring, by the receiver aircraft, its own position co-ordinates;
    receiving, by the receiver aircraft, position co-ordinates of the tanker aircraft;
    determining, on the basis of said position co-ordinates of the first and tanker aircraft, second position information associated to a relative position of the receiver aircraft (1) with respect to the tanker aircraft, said step of varying flight parameters of the receiver aircraft on the basis of the first position information comprising varying the flight parameters of the receiver aircraft on the basis of said first and second position information.

18. The method according to claim 17, further comprising the steps of:
associating a first reliability factor ($C_{RIGHT}$; $C_{LEFT}$), indicating the accuracy of the first position information, to the first position information, obtaining first weighted position information;
associating a second reliability factor ($C_{GPS}$), indicating the accuracy of the second position information, to the second position information, obtaining second weighted position information; and
varying the flight parameters of the receiver aircraft on the basis of said first and second weighted position information.

19. The method according to claim 18, further comprising the step of calculating a conditional expected value of the relative position of the receiver aircraft with respect to the tanker aircraft conditioned with respect to the first weighted position information and to the second weighted position information to obtain first filtered position information, said step of varying flight parameters of the receiver aircraft on the basis of the first and second weighted position information comprising varying the flight parameters of the receiver aircraft on the basis of said first filtered position information.

20. The method according to claim 13, further comprising the steps of:
detecting, by a second detector, arranged on the receiver aircraft, second geometrical information associated to the first and second detection areas;
determining, on the basis of the second geometrical information, third position information associated to a relative position of the receiver aircraft with respect to the tanker aircraft; and
said step of varying flight parameters of the receiver aircraft further comprising varying flight parameters of the receiver aircraft on the basis of the third position information.

21. The method according to claim 18, further comprising the steps of:
associating a third reliability factor ($C_{LEFT}$; $C_{RIGHT}$), indicating the accuracy of the third position information, to the third position information to obtain third weighted position information,
said step of varying flight parameters of the receiver aircraft on the basis of the third position information comprising varying the flight parameters of the receiver aircraft on the basis of said third weighted position information.

22. The method according to claim 20, wherein the step of detecting second geometrical information comprises acquiring in a passive way one or more optical signals identifying said first and/or second detection areas.

23. The method according to claim 20, wherein said step of determining comprises executing, by the receiver aircraft, a second operation of triangulation on the basis of the first and second geometrical information acquired via the second detector.

24. The method according to claim 21, further comprising the step of calculating a conditional expected value of the relative position of the receiver aircraft with respect to the tanker aircraft conditioned with respect to the first, second, and third weighted position information, obtaining second filtered position information, said step of varying flight parameters of the receiver aircraft on the basis of the first, second, and third weighted position information comprising varying the flight parameters of the receiver aircraft on the basis of said second filtered position information.

25. The method according to claim 20, wherein the step of acquiring second geometrical information associated to the first and second detection areas comprises detecting signals of a visible and infrared type.

26. The method according to claim 20, further comprising the steps of acquiring the first and second geometrical information in stereoscopy.

27. The method according to claim 26, further comprising the steps of:
determining, on the basis of the first and second geometrical information acquired in stereoscopy, fourth position information associated to a relative position of the receiver aircraft with respect to the tanker aircraft; and
associating a fourth reliability factor ($C_{STEREO}$), indicating the accuracy of the fourth position information, to the fourth position information to obtain fourth weighted position information,
the step of varying the flight parameters of the receiver aircraft on the basis of the first, second, and third position information further comprising varying the flight parameters of the receiver aircraft on the basis of said fourth weighted position information.

28. The method according to claim 27, wherein said determination step comprises executing a third operation of triangulation on the basis of the first and second geometrical information acquired in stereoscopy.

29. The method according to claim 27, further comprising the step of calculating a conditional expected value of the relative position of the receiver aircraft with respect to the tanker aircraft conditioned with respect to the first, second, third, and fourth weighted position information, obtaining third filtered position information, said step of varying flight parameters of the receiver aircraft on the basis of the first, second, third, and fourth weighted position information comprising varying the flight parameters of the receiver aircraft on the basis of said third filtered position information.

30. The method according to claim 19, wherein said step of calculating a value comprises executing an operation of Kalman filtering.

31. The method according to claim 13, further comprising, prior to the step of detecting first geometrical information, the steps of:
governing the flight path of the receiver aircraft towards an area of encounter between the receiver aircraft and the tanker aircraft;
in the case where the tanker aircraft is not present in the area of encounter, automatically governing the flight of the receiver aircraft so that the receiver aircraft awaits arrival of the tanker aircraft within the area of encounter or in the proximity thereof; and
in the presence of the tanker aircraft in the area of encounter, automatically governing the flight of the receiver aircraft so that the receiver aircraft arranges itself on the tail of the tanker aircraft.

32. The method according to claim 31, further comprising the step of exchanging position data between the receiver aircraft and the tanker aircraft for verifying the simultaneous presence of the first and tanker aircraft within the area of encounter.

33. The method according to claim 31, wherein the step of automatically governing the flight of the receiver aircraft so that the receiver aircraft will set itself on the tail of the tanker aircraft comprises:

governing the flight of the receiver aircraft on the tail of the tanker aircraft at an altitude lower than the altitude of flight of the tanker aircraft; and increasing progressively the altitude of flight of the receiver aircraft keeping it on the tail of the tanker aircraft.

34. An aircraft, comprising an automatic-piloting system configured for being arranged on a receiver aircraft for controlling an in-flight refuelling operation fo the receiver aircraft, comprising:

a first detector, arranged on the receiver aircraft and configured for acquiring first geometrical information associated to a first detection area and a second detection area belonging to a tanker aircraft, said first detection area being related to said second detection area by a geometrical relation known to the automatic-piloting system;

a processor, configured for determining, on the basis of the first geometrical information acquired, first position information associated to a relative position of the receiver aircraft with respect to the tanker aircraft; and an automatic-pilot device coupled to said processor and configured for varying flight parameters of the receiver aircraft on the basis of the first position information.

* * * * *

UNITED STATES PATENT AND TRADEMARK OFFICE
CERTIFICATE OF CORRECTION

| | | |
|---|---|---|
| PATENT NO. | : 8,712,608 B2 | Page 1 of 1 |
| APPLICATION NO. | : 12/968692 | |
| DATED | : April 29, 2014 | |
| INVENTOR(S) | : Pepicelli et al. | |

It is certified that error appears in the above-identified patent and that said Letters Patent is hereby corrected as shown below:

Title page:

Assignee (item 73):

Change "Alenia Aeronautics S.p.A." to -- Alenia Aeronautica S.p.A. --.

Signed and Sealed this
Thirtieth Day of December, 2014

Michelle K. Lee
*Deputy Director of the United States Patent and Trademark Office*